(12) United States Patent
Morell

(10) Patent No.: US 7,450,762 B2
(45) Date of Patent: Nov. 11, 2008

(54) METHOD AND ARRANGEMENT FOR DETERMINING AN OBJECT CONTOUR

(75) Inventor: Adam Morell, Lund (SE)

(73) Assignee: Cellavision AB, Lund (SE)

( * ) Notice: Subject to any disclaimer, the term of this patent is extended or adjusted under 35 U.S.C. 154(b) by 114 days.

(21) Appl. No.: 10/565,277

(22) PCT Filed: Jul. 21, 2004

(86) PCT No.: PCT/SE2004/001147

§ 371 (c)(1),
(2), (4) Date: Jul. 17, 2006

(87) PCT Pub. No.: WO2005/008569

PCT Pub. Date: Jan. 27, 2005

(65) Prior Publication Data

US 2006/0274946 A1    Dec. 7, 2006

(30) Foreign Application Priority Data

Jul. 21, 2003    (SE) .................................... 0302114

(51) Int. Cl.
*G06K 9/48*    (2006.01)

(52) U.S. Cl. ...................... 382/199; 382/199; 382/134; 382/133; 382/280; 359/196; 359/210

(58) Field of Classification Search .................. 382/199, 382/128, 115, 156; 324/309; 706/15, 20
See application file for complete search history.

(56) References Cited

U.S. PATENT DOCUMENTS

| | | | | | |
|---|---|---|---|---|---|
| 4,982,161 | A | * | 1/1991 | Twieg | 324/309 |
| 5,687,251 | A | * | 11/1997 | Erler et al. | 382/133 |
| 2001/0016055 | A1 | * | 8/2001 | Harkless et al. | 382/115 |
| 2002/0186874 | A1 | * | 12/2002 | Price et al. | 382/133 |
| 2003/0142750 | A1 | * | 7/2003 | Oguz et al. | 375/240.18 |

FOREIGN PATENT DOCUMENTS

WO    WO 0182216 A1    11/2001

OTHER PUBLICATIONS

Gradient Vector:A New External Force for Snakes , Xu et al,IEEE 1997.*

(Continued)

*Primary Examiner*—Andrew W. Johns
*Assistant Examiner*—Nancy Bitar
(74) *Attorney, Agent, or Firm*—Harness, Dickey & Pierce, PLC

(57) ABSTRACT

A method is disclosed for determining a sought object contour in a digital microscope image, which includes a plurality of image elements and reproduces a biological material. The method includes assigning edge values to at least a first subset of the image elements in the image; assigning values of a first gradient vector component whose values each includes a first linear combination of edge values of some surrounding image elements to at least a second subset of the image elements in the image; assigning values of a second gradient vector component whose values each include a second linear combination of edge values of some surrounding image elements to at least a third subset of the image elements in the image; and calculating an estimate of the sought object contour based upon values of the first and second gradient vector components.

6 Claims, 10 Drawing Sheets

OTHER PUBLICATIONS

Ch Chenyang; Prince Jerry L, "Gradient Vector Flow: A New External Force For Snakes" Proc. IEEE Comput. Soc. Conf. Comput. Vision Pattern Recognit; 1997, ISSN 1063-6919.

Chenyang Xu; Prince J L, "Snakes, Shapes, And Gradient Vector Flow" IEEE Transactions on Image Processing, Mar. 1998, IEEE, USA, ISSN 1057-7149, vol. 7, Nr 3, pp. 359-369.

Cseke, I, "A Fast Segmentation Scheme For White Blood Cell Images" 11th IA PR International Confetrence on Pattern Recognition. vol. III. Conference C; Image, Speech and Signal Analysis, 1992, ISBN 0-8186-2920-7.

Elmoataz, A., Revenu, M, Porquet, C, "Segmentation And Classification Of Variuous Types Of Cells In Cytological Images" 1992, IEEE, ISBN 0-85296-543-5.

* cited by examiner

METHOD AND ARRANGEMENT FOR DETERMINING AN OBJECT CONTOUR

Cross reference to related application: This application claims benefit from Swedish patent application no SE-0302114-4, filed Jul. 21, 2003.

FIELD OF THE INVENTION

The present invention relates to a method of determining a sought object contour in a digital microscope image according to the preamble of claim 1. The invention also concerns a corresponding arrangement according to the preamble of claim 5 and a digital storage medium comprising a corresponding computer program according to the preamble of claim 6.

BACKGROUND ART

The blood of humans contains red blood cells, platelets and white blood cells. In medical applications there is often an interest in classifying the white blood cells into approximately twenty different sub classes and in estimating the distribution of these subclasses for individual patients. Traditionally this classification may be performed in a laborious way by a human expert looking through the eyepiece of a brightfield microscope and thereby studying blood which has been wedged on a slide. The classification may also, with less separable sub classes though, be performed in a so called cell counter where diluted blood passes, cell by cell, through a narrow strait in a so called flow cell. While the cells pass through the flow cell parameters like electrical impedance and light scattering are measured, which subsequently are the basis for the classification of the actual white blood cell performed by the cell counter.

The advances within image analysis during recent years have made it possible to produce automatical brightfield microscopes that are capable of scanning a blood smear for white blood cells, autofocus on them, store well focused cell images, perform automatical segmentation of the resulting cell images, calculate so called features for each segmented cell image and finally classify each found white blood cell based on the information in the calculated features.

Segmentation is the process of splitting the contents of an image into different regions. In the case of white blood cells, the desired result is that white blood cells are separated from the other objects in the image like background, red blood cells, platelets, garbage and, of course, from other white blood cells. It may also be desirable that the segmentation separates the nucleus of the white blood cell from its cytoplasm.

The main reason for segmenting the individual cells and their parts is that there, today, do not exist any classifaction methods that work well enough and quickly enough without the separation of image information that the segmentation corresponds to.

Acceptable segmentation results may sometimes be obtained by using so called binary thresholding, meaning that each image element, also called pixel, in the cell image is dealt with depending on if its intensity is greater than or below a threshold intensity. The threshold intensity may be local or global, i.e. constant over the whole image.

An apparent drawback of binary thresholding is that the object contour that is obtained is sensitive to the level of the chosen threshold intensity, for example when the illumination conditions vary within av cell image. In addition, thresholding is performed regardless of shape or so called non-local information, i.e. how the object appears at some distance from the sought contour. Binary thresholding may therefore give the result that adjacent objects are not separated but segmented as one object or that an object with an original smooth, rounded contour gets a zigzag contour after segmentation. Binary thresholding may also give the result that a single original object is segmented as multiple objects. Binary thresholding and more sophisticated thresholding methods are therefore most often only used as initial operations in more powerful segmentation methods.

So called active contour models is a class of methods that have been used for quite a while for segmentation of images. Using the active contour models the contour of the object is determined directly instead of indirectly via which image elements that belong to the object, like it is done using thresholding. All active contour models use some kind of contour that iteratively, during the process of segmentation, is altered under the influence of so called internal forces that originate from the contour and its shape and under the influence of so called external forces that originate from the image and mainly from its contents of edge information.

One way of enhancing edge information in images is to calculate so called gradient images. Briefly that means that elements in the image, where the intensity is increased or decreased with a large amount on a distance corresponding to a few image elements, get correspondingly large values at the corresponding image element positions in the gradient image. Edges are a good example of objects that give rise to large gradient values. The gradient images may then be post-processed in order to get rid of isolated large values, that probably were caused by garbage or small details, and in order to enhance long joint streaks of large values probably caused by edges of the sought object and other objects. An image where the values of the image elements consist of some kind of gradient values will be called an edge image below.

The active models may be divided into two groups. The first group is the group of geometrical models like "Level Sets" and "Fast Marching" methods. The contour is represented by the set of image elements of the contour. The advantage of that representation is that the contour may have arbitrary shapes. The iterations comprise operations on the image elements of the contour and their corresponding closest neighbours. Since the contour may have arbitrary shapes, it is relatively complicated and computationally heavy to administrate all the image elements of the contour, their neighbours and their matual relative positions.

The second group is the group of parametrical models like "snakes", see the paper "Snakes: Active contour models," International Journal of Computer Vision, 1(4): 321-331, 1987, by Kass, Witkin och Terzopoulos. A snake is a parametric contour model. The parameters in the model may for example consist of the positions of the corners of a polygon, but most often the model is more advanced, for example by consisting of joint curved contour elements. The internal forces of the snake strive for a smooth contour while the external forces strive for letting the contour pass close to many of the image elements that contain edge information. During the process of segmentation, an algorithm based on snakes will itererate position and shape of the snake until a good compromise—hopefully the most fitting contour—between internal and external forces is found. By increasing the influence of the internal forces, the shape of the final contour estimate may become more or less limited to circular shaped objects. By correspondingly increasing the influence of the external forces, the shape of the final contour estimate may become more irregular. Since the snake is represented by a limited number of parameters, its possible shapes are limited.

For white blood cells, which have fairly regular contours, this limitation is seldom a drawback. On the contrary, it is an advantage that the snake will have a regular shape even in those cases where the contour of the object is seen only vaguely in the cell image and where it therefore will be quite a distance between image elements having edge information. In addition, the limited number of parameters will lead to that the computational power needed during iterations will be less compared to that of a geometrical model.

If the snake is started close to the sought contour, it will probably converge safely and with a small number of iterations. Such a start may be easy for a human operator but harder to accomplish using automatic image analysis. Automatic segmentation will therefore require that the snake may be started relatively far away from the sought object contour but still converge safely and quickly. That requirement will in turn lead to the requirement that the external forces of the snake must be able to lead the snake correctly even from image elements that are situated far away from the sought contour. In order to be useful as input to a snake, the external forces should simply, for each image element in the original image, be pointing towards image elements with a greater amount of edge information, i.e. with greater edge resemblance. Therefore it is suitable to use the expression "vector force field" for the external forces as a function of the location in the cell image.

One previously known way of obtaining a vector force field is to start with an edge image with values f(x,y), that depend on the x and y coordinate of the corresponding image element and calculate differences in f(x,y) with respect to x and y. The calculations of differences may for example be defined by $$f\_x(x,y)=f(x+1,y)-f(x-1,y) \quad \text{(eq. 1) and}$$

$$f\_y(x,y)=f(x,y+1)-f(x,y-1) \quad \text{(eq. 2), respectively.}$$

The obtained vector force field [f_x(x,y),f_y(x,y)] is an example of an external force field. The greatest drawback of such a vector force field is that the amount of force rapidly descends as the coordinates (x,y) move away from those points that have an edge image f(x,y) that differs from zero. Thus, such a vector force field does not work very well when the snake is started from a distance relatively far away from the sought object contour.

One previously known way of improving the ability of the vector force field to act at a distance is to smear the edge image, before or after the calculations of differences with for example a two-dimensional Gaussian filter, but that may result in other problems like details that become less apparent.

The Gradient Vector Flow Method is a previously know method that accomplishes a static external vector force field, a so called GVF field (Gradient Vector Flow Field), calculated on the basis of a, like shown above, difference calculated edge image containing information on the sought object contour. (See for example the Master's thesis "Segmentation of Histopathological Tissue Sections Using Gradient Vector Flow Snakes", Centre for Mathematical Sciences, Lund University and Lund Institute of Technology, Mar. 18, 2002, by Adam Karlsson or the original reference "Gradient vector flow: A new external force for snakes," IEEE Proceedings on Computer Vision and Pattern Recognition, Puerto Rico, pages 66-71, 1997 by Xu och Prince).

A GVF-field fulfills the requirement of being an external vector force field that leads the snake in the correct direction also at large geometrical distances from the sought contour. A snake that uses a GVF-field is called a GVF-snake below. The GVF-field is then calculated once per segmentation—at the beginning of it. Such segmentation methods are previously known.

In the Master's thesis above by Adam Karlsson there is further described a fast way of iterating the parameters of the snake, i.e. how the position and the shape of the snake is iterated based on the GVF-field. In the thesis it is pointed out that the timing performance of a GVF-snake, which uses this fast way of iterating the parameters, will be limited by the time it takes to calculate the GVF-field.

The traditional way of calculating the GVF field according to Xu och Prince contains iterative solving of $$\mu \Delta u - (u - f\_x)(f\_x^2 + f\_y^2) = 0 \quad \text{(eq. 3) and}$$

$$\mu \Delta v - (v - f\_x)(f\_x^2 + f\_y^2) = 0 \quad \text{(eq. 4),}$$

where Δ is the so called Laplace operator—a kind of two-dimensional second order difference operator—and where μ is a parameter that may have to be tuned depending on the application, i.e. what kind of objects it is and in which environment they are situated.

The calculation of the GVF-field means that a vector force field [f_x(x,y),f_y(x,y)] with limited ability to act at a distance results in another vector force field—the GVF-field, [u(x,y),v(x,y)]—with an improved ability to act at a distance without the loss of details. The input to the calculation can be regarded as two images, f_x and f_y respectively, and the output can be regarded as two other images, u and v respectively.

Solving equation systems 3 and 4 requires a considerable amount of iterations in order to get a converged result. If the area of interest in the original image has the size of m times n pixels, each of the equation systems 3 and 4, will contain m times n equations, which means just as many unknowns, which for images easily becomes ten thousand unknowns which shall be updated during each iteration.

It is not unusual that the traditional way of calculating the GVF-field, with a 1 GHz PC-processor, will need several tenths of a second per cell image. For an analysis of 200 white blood cells that corresponds to a total segmentation time of close on one minute, which limits the performance of existing automatic brightfield microscopes unless extra, expensive hardware is added.

SUMMARY OF THE INVENTION

An object of the present invention is to wholly or partly eliminate the above problems.

This object is achieved by a method of determining a sought object contour in a digital image according to claim 1, by a corresponding arrangement according to claim 5 and a digital storage medium comprising a computer program according to claim 6.

More specifically, the invention then relates, according to a first aspect, to a method of determining a sought object contour in a digital microscope image, which comprises a plurality of image elements and reproduces a biological material. The method is characterized by the steps of assigning edge values to at least a first subset of the image elements in the image; assigning values of a first gradient vector component whose values each comprise a first linear combination of edge values of some surrounding image elements to at least a second subset of the image elements in the image; assigning values of a second gradient vector component whose values each comprise a second linear combination of edge values of some surrounding image elements to at least a third subset of the image elements in the image; and calculating an estimate of the sought object contour based upon values of the first and the second gradient vector components.

Such a method has been found to result in a quickly computed approximative GVF field, denoted AGVF field below. The computation of the AGVF field is performed so that, although the resulting AGVF field differs somewhat from the traditional GVF field, the segmentation results for white blood cells appear to be mainly unaffected. Using a method according to the invention, the time for using snakes with GVF performance in the segmentation can thus be considerably lowered. The present invention therefore makes it possible to use an improved segmentation in commercially available automatical scanning microscopes for analysis of white blood cells.

For other applications than white blood cells, AGVF may be used as it is or as a way of accelerating, for example by skipping the initial iterations in a traditional GVF method.

According to a second aspect, the invention concerns an arrangement for determining a sought object contour in a digital microscope image, which comprises a plurality of image elements and reproduces a biological material. The arrangement is characterized by means for assigning edge values to at least a first subset of the image elements in the image; means for assigning values of a first gradient vector component whose values each comprise a first linear combination of edge values of some surrounding image elements to at least a second subset of the image elements in the image; means for assigning values of a second gradient vector component whose values each comprise a second linear combination of edge values of some surrounding image elements to at least a third subset of the image elements in the image; and means for calculating an estimate of the sought object contour based upon values of the first and the second gradient vector components.

The arrangement gives advantages corresponding to those of the method and can also be varied similarly.

According to a third aspect, the invention relates to a digital storage medium comprising a computer program for determining a sought object contour in a digital microscope image, which comprises a plurality of image elements and reproduces a biological material. The storage medium is characterized by instructions corresponding to the steps of assigning edge values to at least a first subset of the image elements in the image; assigning values of a first gradient vector component whose values each comprise a first linear combination of edge values of some surrounding image elements to at least a second subset of the image elements in the image; assigning values of a second gradient vector component whose values each comprise a second linear combination of edge values of some surrounding image elements to at least a third subset of the image elements in the image; and calculating an estimate of the sought object contour based upon values of the first and the second gradient vector components.

The computer program gives advantages corresponding to those of the method and can also be varied similarly.

DESCRIPTION OF PREFERRED EMBODIMENTS

Figure 1A:
FIGS. 1a and 1b show a digital gray scale image of a white blood cell surrounded by background, red blood cells and a platelet. The image is an example of what is meant by a cell image.
Figure 1B:
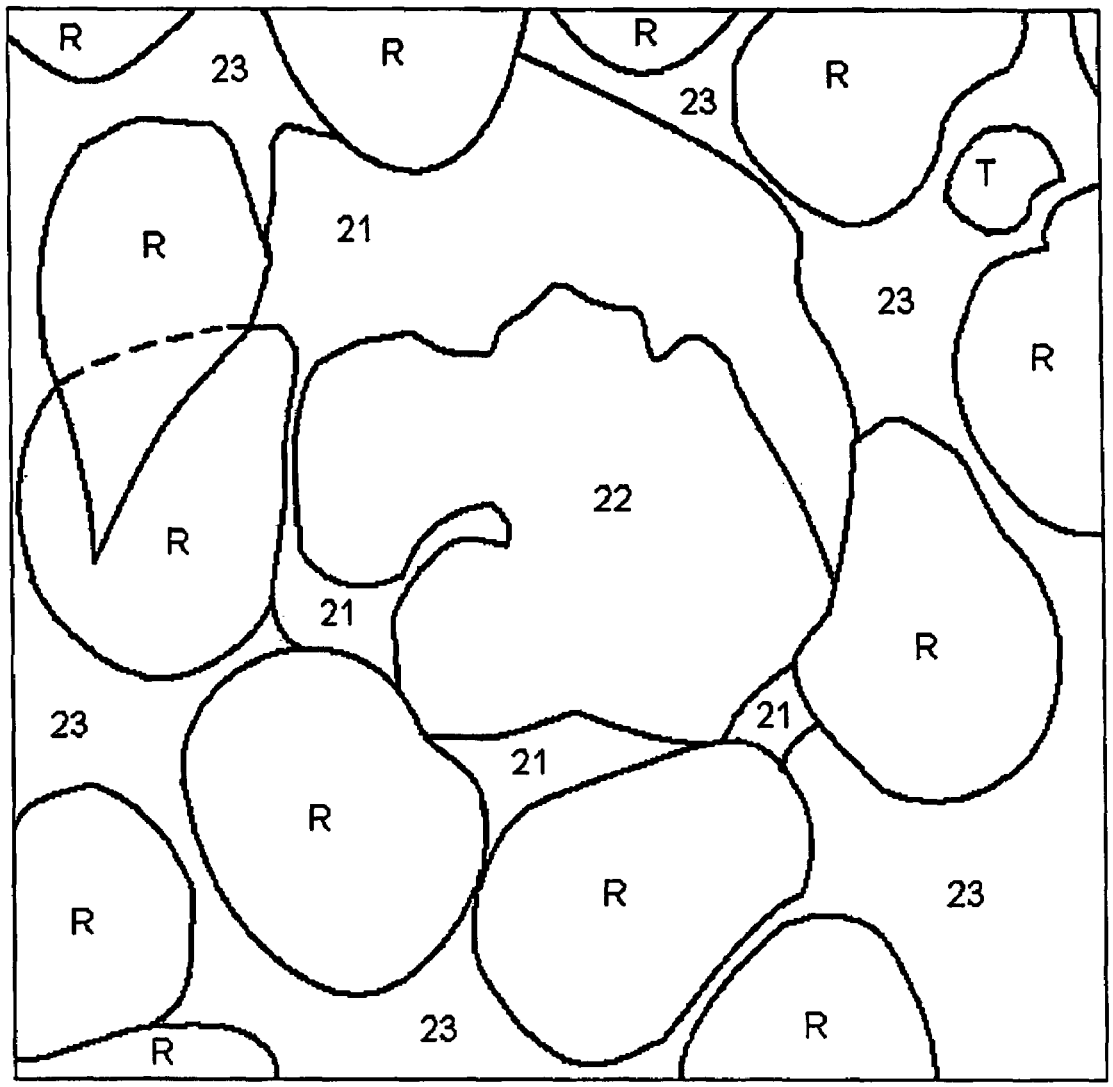

A white blood cell consists, from a segmentation point of view, of two parts—the cell nucleus 22 and the surrounding cytoplasm 21. The results of segmentation of the two parts are to some amount dependent upon one another:

In order to succeed in finding the border between cytoplasm and background using automatic image analysis in spite of the presence of adjacent cells, marked R and T in FIG. 1b, it is useful to be able to start the snake from a so called seed contour which is completely inside the cell. Therefore one wishes to have access to an estimate, for example a segmentation, of the cell nucleus as a so called seed contour for the snake.

In order to simplify the segmentation of the cell nucleus it is, on the other hand, good to have access to an image where there is only cytoplasm and cell nucleus left—i.e. an image where the cell already is segmented from the background and adjacent cells. To avoid an iterative process, a preliminary segmentation, see FIG. 2, of the cell nucleus is used in one preferred embodiment. That segmentation is good enough for its purpose.

In one preferred embodiment a number of partial operations are performed starting from an original cell image, which, like the image in FIG. 1a, contains the white blood cell whose contour and nucleus are sought. FIG. 8b gives a survey of how means corresponding to these partial operations may relate to one another.

Preliminary Segmentation of the Nucleus

Figure 2:
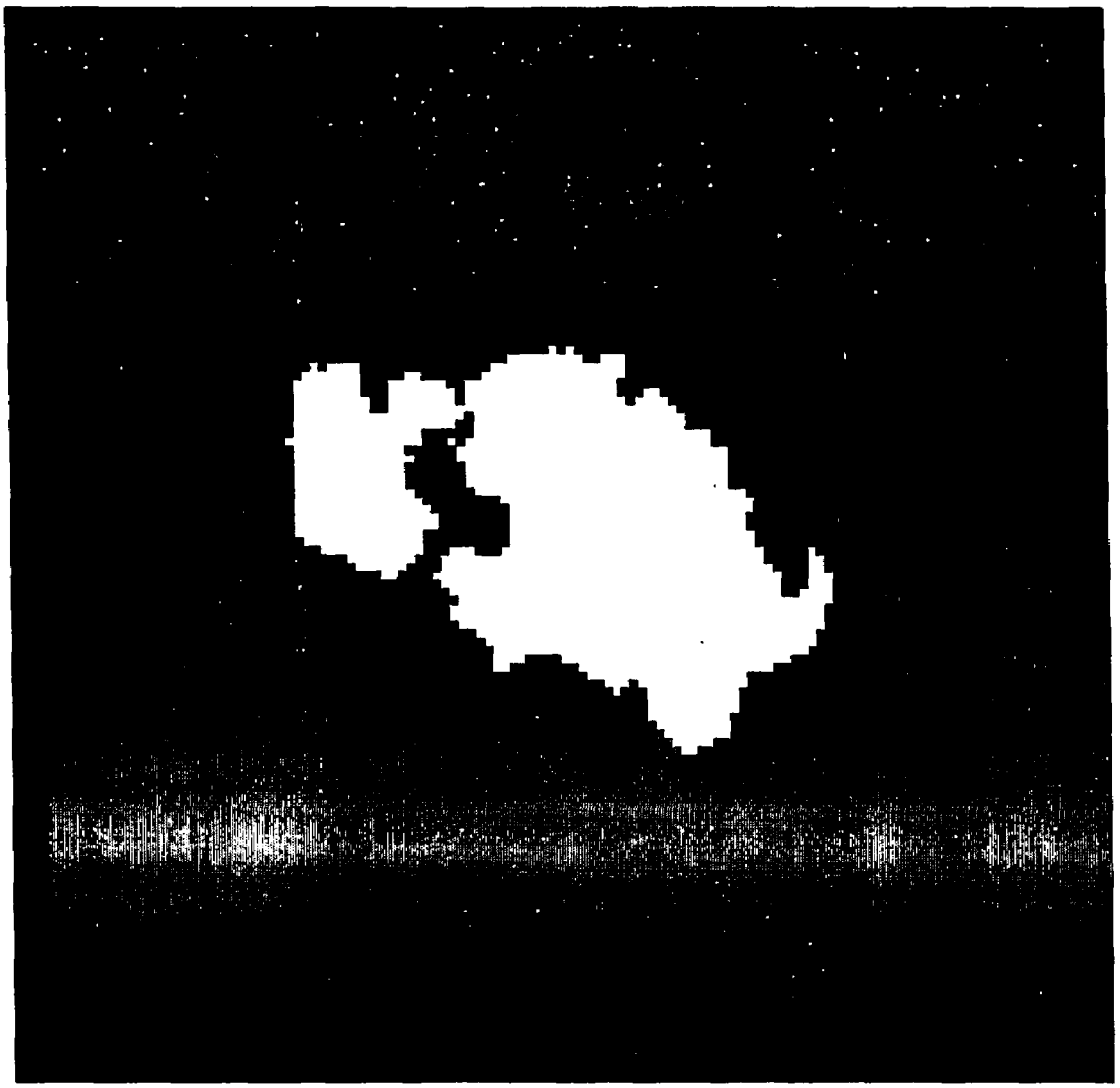
FIG. 2 shows a preliminary thresholding of the nucleus of the white blood cell.

During the partial operation corresponding to 83, a preliminary segmentation of the nucleus is calculated in order to achieve a seed contour for a snake. FIG. 2 shows the result of such a preliminary segmentation. This preliminary segmentation is performed using known binary thresholding methods preferrably operating on the green colour component of the original cell image or, possibly, on a weighted combination of green and blue colour component.

Calculation of the Edge Image

In partial operation corresponding to 84 the values of an edge image are calculated by for example a gradient operation followed by a processing that only lets the strongest edges remain in the image. See the darkest areas of FIG. 3.

Figure 3:
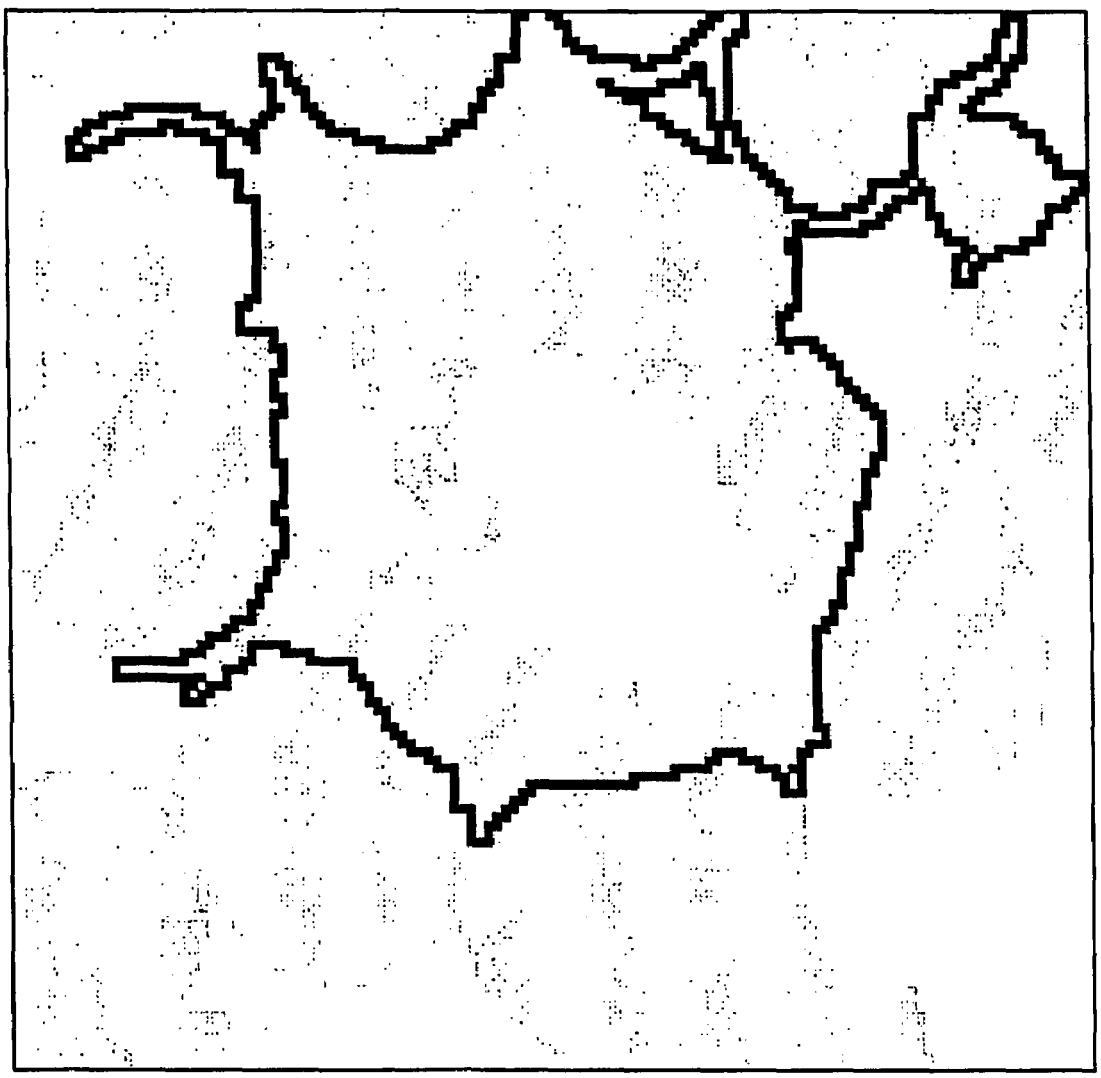
FIG. 3 shows an edge image where the darkest areas are possible cell contours and the brightest areas are such that most likely are not cell contours.

In the edge image it is preferred to incorporate the preliminary nucleus as an "anti"-edge with negative values of its edge image elements—see the brightest areas in FIG. 3. By doing so, the edge image will, when the AGVF-field has been calculated, have added the information that the sought cell contour is situated outside the cell nucleus.

In a preferred embodiment, the edge image is trinary, i.e. its elements have three possible values, one value for edge (1), one value for nucleus (−1) and one value for other (0). It is also possible to let the edge values and the nucleus values differ individually from the value for other (0).

It is not necessary to calculate the contents of the edge image for all image elements of the cell image. It is sufficient to calculate it in the surroundings of the preliminarily segmented cell nucleus, where the surroundings are large enough to safely contain a white blood cell. By not working with an unnecessarily large edge image, there is a cut in the amount of calculations needed—especially during the calculation of the AGVF field.

It is preferable to choose a quadratic edge image with side lenghts that are a potence of 2 image elements, since the Fourier transforms below are most efficiently calculated for such side lenghts using the well known Fast Fourier Transform, FFT. Such a quadratic edge image is an example of a first subset of image elements.

Determination of Snake Seed

Figure 5:
FIG. 5 shows a possible seed contour for a snake—namely the so called convex hull of the preliminarily thresholded cell nucleus of FIG. 2.

In the partial operation corresponding to 85 a calculation of a seed contour is performed using data from a partial operation corresponding to 83 as the input. For segmentation of white blood cells the so called convex hull of the preliminarily segmented nucleus is preferably used. By the expression "convex hull" a set of image elements with a convex contour containing all the image elements of the preliminarily segmented cell nucleus is intended. See FIG. 5.

Calculation of the Components of the AGVF Field

In the partial operation 86 values for the components of the AGVF field are calculated using the edge image from a partial operation corresponding to 84 as input. The calculations may be performed using at least two methods corresponding to one principle each.

According to the first method, the edge image is differentiated first, which is preferably done according to equations 1 and 2 above.

Then the main AGVF calculation is performed. According to the invention, the AGVF field is calculated by solving $$\mu \Delta u - (u - f\_x) \cdot 1 = 0 \qquad \text{(eq. 5) and}$$

$$\mu \Delta v - (v - f\_y) \cdot 1 = 0 \qquad \text{(eq. 6),}$$

where $\Delta$ is the so called Laplace operator—a kind of two-dimensional second order difference operator, which preferrably is calculated by two-dimensional filtering with the 3 by 3 matrix $$L = \begin{matrix} 0 & 1 & 0 \\ 1 & -4 & 1 \\ 0 & 1 & 0 \end{matrix}.$$

Equations 5 and 6 may then be rewritten as $$(\mu L - 1) * u = -f\_x \qquad \text{(eq. 7) and}$$

$$(\mu L - 1) * v = -f\_y \qquad \text{(eq. 8),}$$

where the symbol * means so called convolution of the 3 by 3 matrix ($\mu L - 1$) and the m by n images u and v respectively. The contents of the 3 by 3 matrix is thus a weighted combination of a Laplace filter and a unity filter. This rewriting is the key to the speed in the present AGVF method. It is a well known fact that convolution is replaced by element wise multiplication during Fourier transform and vice versa.

Such rewriting is not possible with the traditional GVF method due to that the factor ($f\_x^2 + f\_y^2$), which varies over the image, exists in equations 3 and 4.

Equations 7 and 8 may be quickly solved using the Fast Fourier Transform, FFT. The components u and v of the AGVF field may in that way, explicitly, be obtained through the expressions $$u = -F^{-1}[F(f\_x) \cdot / F(\mu L - 1)] \qquad \text{(eq. 9) and}$$

$$v = -F^{-1}[F(f\_y) \cdot / F(\mu L - 1)] \qquad \text{(eq. 10),}$$

where F denotes the two-dimensional discrete Fourier Transform, $F^{-1}$ denotes the corresponding inverse Fourier Transform and $\cdot /$ denotes element wise division in the frequency plane.

As long as $\mu$ is constant, neither $F(\mu L - 1)$ nor $1 \cdot / F(\mu L - 1)$ will vary, which leads to that the whole partial result $1 \cdot / F(\mu L - 1)$ may be stored in order to speed up the calculations even more.

Suitable values of $\mu$ may be in the range 10-30. Which values that are the best depends on the sought objects, the magnification of the objective, the cell size, the pixel size of the camera, etc. It is recommended to choose $\mu$ by experimenting with a number of cells under manual supervision of the segmentation.

As can be seen in equations 9 and 10, the calculations of u and v are linear operations on f\_x and \_y respectively, which in their turn come from linear differentiation operations on f. Therefore it is possible, according to a second possible calculation method, for such edge images where the numerical stability allows for it, to change the order of differentiation and filtering and save 50% of the calculations for the Fourier Transform operations. Such a method for calculating AGVF consists of the operations:

$$w = -F^{-1}[F(f) \cdot / F(\mu L - 1)] \qquad \text{(eq. 11),}$$

$$u\_w(x,y) = w(x+1,y) - w(x-1,y) \qquad \text{(eq. 12) and}$$

$$v\_w(x,y) = w(x,y+1) - w(x,y-1) \qquad \text{(eq. 13),}$$

where the symbols u\_w and v\_w have been chosen to emphasize that the two components of the AGVF field, in this case, have been calculated from a common filtering result, w.

Since the Laplace operator has a certain geometrical width, it is not obvious that the components of the AGVF field are useful or even valid all the way to the borders of the edge image. As a consequence, the second and the third subset of image elements, that get useful values of the AGVF field components may be somewhat smaller than the first subset.

It is not necessary to use an orthogonal coordinate system x and y, neither in the microscope image, in the edge image nor in the AGVF field, but it makes the calculations simpler.

Figure 4:
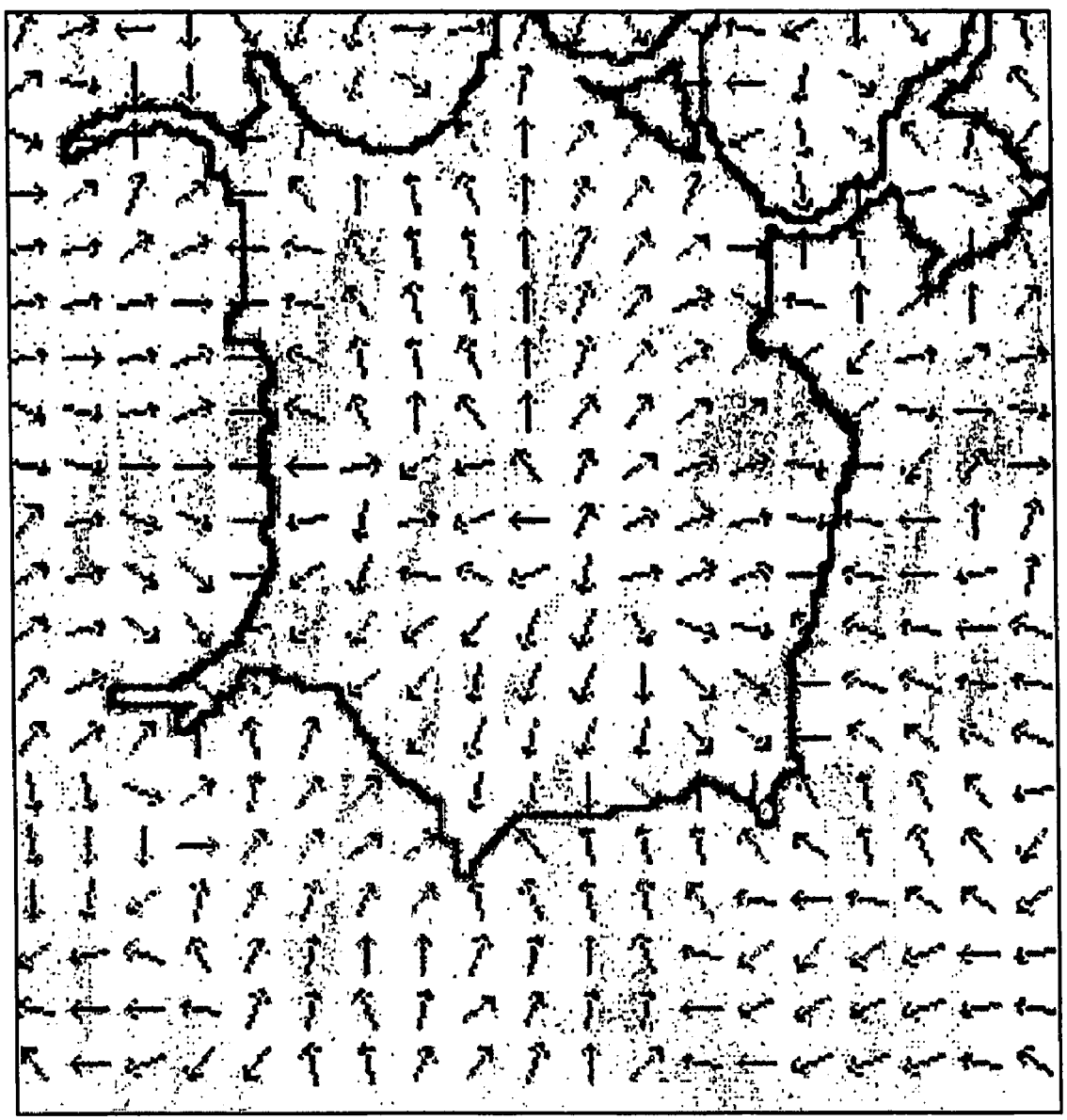
FIG. 4 shows, with arrows, one from the edge image obtained approximative GVF field superimposed on FIG. 3 for comparison.

In one preferred embodiment there is also performed a normalisation of the element wise magnitude of the AGVF field, se the field in FIG. 4. Such a normalisation aims at enhancing the direction of the external vector force field, which is the most important information for the snake algorithm.

Calculation of the Estimate of the Sought Cell Contour

Figure 6:
FIG. 6 shows the estimated object contour when the segmentation is finished with the cytoplasm, i.e. the cell contour.

In the partial operation corresponding to 87 the sought cell contour is estimated based upon a seed contour from a partial operation corresponding to 85 and upon the AGVF field from a partial operation corresponding to 86. The estimation is preferrably calculated using a snake, i.e. using a parametric contour model, like described in the Master's thesis mentioned above. See FIG. 6.

Calculation of the Final Segmentation of the Cell Nucleus

Figure 7:
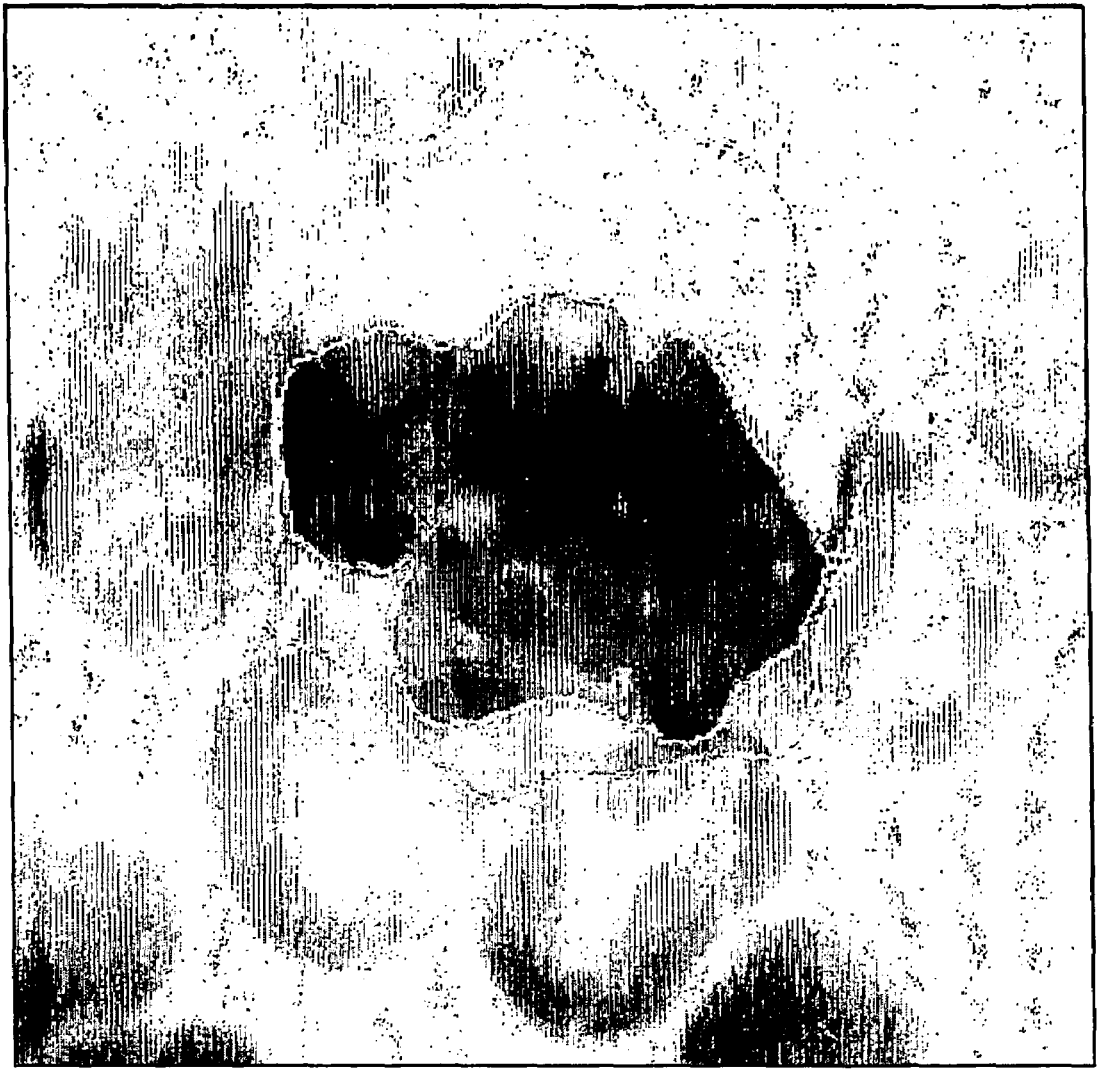
FIG. 7 shows the estimated cell contour of FIG. 6 together with the estimated contour of the cell nucleus.

In the partial operation corresponding to 88, an estimate of the final cell nucleus contour is calculated, if needed. This can be done with a method that works based upon the estimated cell contour from a partial operation corresponding to 87. Se FIG. 7. One possible way is to use a linear transformation from the three colour components of the cell image to two transformed colour components together with a border in the plane of the two transformed colour components. The transformation and the border have, preferably, been determined earlier by experiments with manually segmented cells where the transformation as well as the border have been optimized in order to optimally classify cytoplasm elements and nucleus elements to their correct classes. The experiments may have to be reperformed for each new type of staining of the white blood cells. Another possible method is that the partial operation adaptively changes the transformation and/or the border, in order to track variations in the staining, by maximizing the spatial homogeneity of the image elements that have been directed to each class.

Results of the Segmentation

The segmentation result from a partial operation corresponding to 89 consists of the cell contour, the nucleus contour and the cell image. By applying the contours, the whole cell or the separated cytoplasm and nucleus can be obtained as segmented images.

Figure 8A:
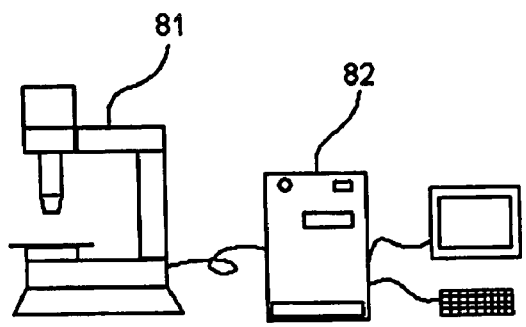
FIGS. 8a and 8b show an arrangement according to the invention.
Figure 8B:
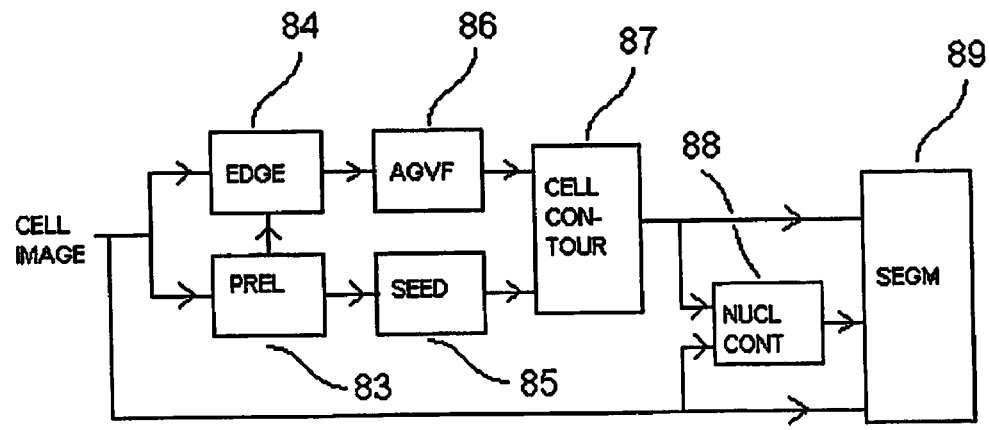

FIG. 8a shows a system with an arrangement according to the invention. That system comprises a digital microscope 81, which is connected to a computer system 82. The digital microscope 81 delivers digital microscope images in gray scale or in colour to the computer system 82. A certain amount of digital processing of the digital images may preceed their delivery to the computer system 82. The computer system 82 may be integrated in the microscope 81.

The computer system 82 comprises means 83-89 for performing the steps that are included in the segmentation method described above.

There is included a means 83 for choosing, from a digital image, a set of image elements, which probably are cell nucleus elements. The output of this means is an indication of which elements that have been chosen in the image, see FIG. 2.

There is further included a means 84 for, based upon the digital cell image and upon the output from means 83, calculating edge values for a set of image elements that at least comprises the image elements that were chosen by means 83. The output of this means is an edge image, see FIG. 3.

There is further included a means 85 for, based upon the output of means 83, determining a seed contour. The output of this means is the seed contour, see FIG. 5.

The output from means 84 is fed to a means 86, which, for the image elements that are included in the edge image, calculates the values of the components in an approximate GVF field. The output from means 86 are the values of the two components in the AGVF field.

The outputs from means 85 and 86 are fed to a means 87 that, with a snake method, estimates the object contour, which also is the output of the means.

Using means 88, a final estimate of the cell nucleus can be determined based upon the digital cell image, the output from means 87 and a colour transformation and a border, the two latter being fixed or adaptively changing. The output from means 88 consists of the estimated cell nucleus.

Means 89 is capable of, based upon the digital cell image and the output from means 87 and 88, producing partial images of cell, cytoplasm and cell nucleus. The output consists of the partial images, which may be further analyzed in the subsequent image analysis operations like feature calculation and classification using artificial neural networks.

The means 83-89 that are mentioned above may in general consist of the computer system, equipped with a computer program for performing the steps in the method. This computer program can be stored separately on a digital storage medium. It is however also possible to implement at least some of the means shown above in hardware, for example as ASIC circuits or as FPGA circuits.

It is also possible to perform calculations in a distributed way. The segmentation method does not have to be performed at the location of the microscope. The whole method or parts of it may be performed in an Internet-server, situated at a distance from the microscope.

Figure 9:
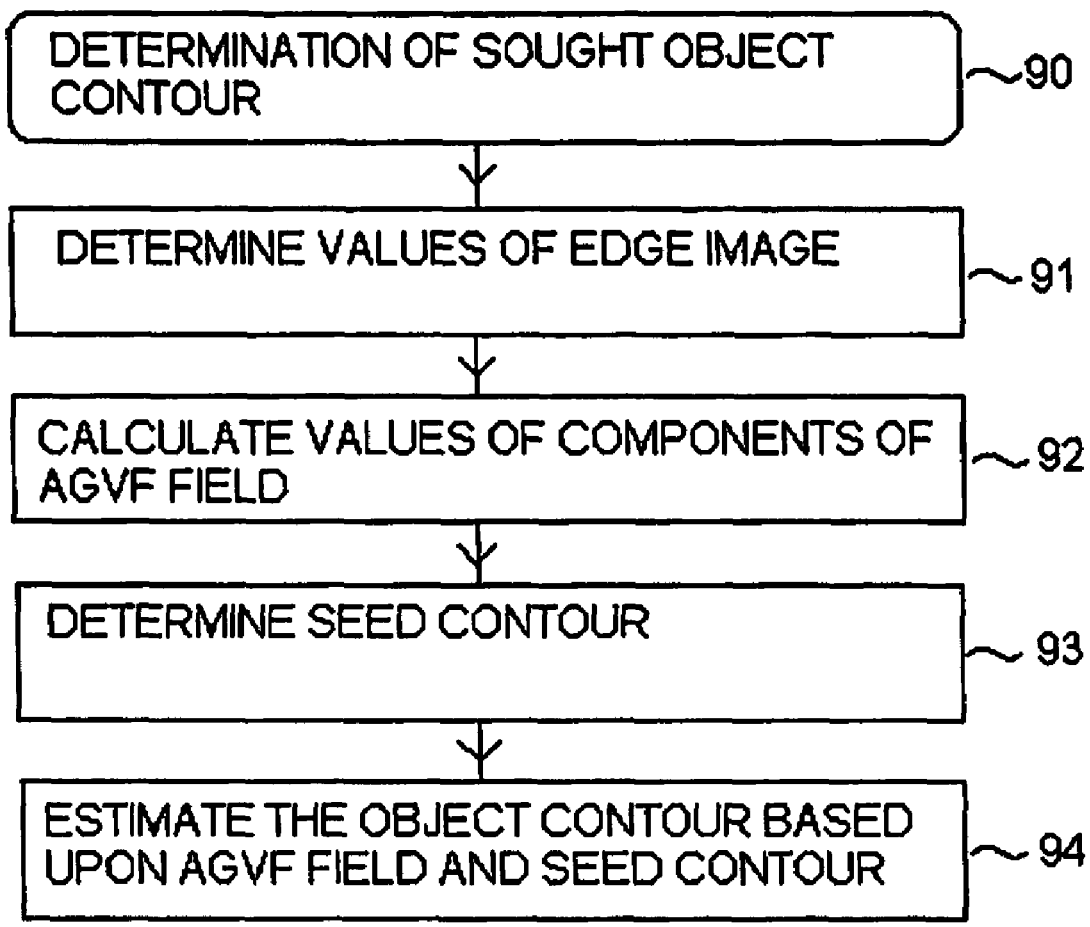
FIG. 9 is a flow chart of a method according to the invention.

FIG. 9 shows a flow chart for a method 90, according to the invention, for determining a sought object in a digital image.

In a first step 91 values of the elements in an edge image are determined.

In a second step 92 values of the components of an AGVF field are determined.

In a third step 93 a seed contour is determined.

In a fourth step 94 the sought object contour is, preferrably using a snake, determined based upon the values of the AGVF field and the seed contour.

The invention is useful for other applications than segmenting of white blood cells, like for example for segmenting of individual cell nuclei in histopathological tissue sections.

The invention claimed is:

1. A method of determining, using an active contour model, a sought object contour in a digital microscope image, which includes a plurality of image elements and reproduces a biological material, the method comprising:

assigning edge values to at least a first subset of the image elements in the image;

assigning values of a first gradient vector component whose values each comprise a first linear combination of edge values of some surrounding image elements to at least a second subset of the image elements in the image, wherein the first linear combination corresponds to, in arbitrary order, a differentiation in one direction in the image plane and a filtering in the image plane with the inverse of a 3 by 3 filter, the filter corresponding to a filtering with a weighted combination of a Laplace filter and a unity filter;

assigning values of a second-gradient-vector component whose values each comprise a second linear combination of edge values of some surrounding image elements to at least a third subset of the image elements in the image, wherein the second linear combination corresponds to, in arbitrary order, a differentiation in another direction in the image plane and a filtering in the image plane with the inverse of a 3 by 3 filter, the filter corresponding to a filtering with a weighted combination of a Laplace filter and a unity filter; and calculating an estimate of the sought object contour based upon values of the first and the second gradient vector components.

2. A method as claimed in claim 1, wherein the first and the second linear combinations are calculated using Fourier transform.

3. An arrangement for determining, using an active contour model, a sought object contour in a digital microscope image, which includes a plurality of image elements and reproduces a biological material, the arrangement comprising:

means for assigning edge values to at least a first subset of the image elements in the image;

means for assigning values of a first gradient vector component whose values each comprise a first linear combination of edge values of some surrounding image elements to at least a second subset of the image elements in the image, wherein the first linear combination corresponds to, in arbitrary order, a differentiation in one direction in the image plane and a filtering in the image plane with the inverse of a 3 by 3 filter, the filter corresponding to a filtering with a weighted combination of a Laplace filter and a unity filter;

means for assigning values of a second gradient vector component whose values each comprise a second linear combination of edge values of some surrounding image elements to at least a third subset of the image elements in the image, wherein the second linear combination corresponds to, in arbitrary order, a differentiation in another direction in the image plane and a filtering in the image plane with the inverse of a 3 by 3 filter, the filter corresponding to a filtering with a weighted combination of a Laplace filter and a unity filter; and means for calculating an estimate of the sought object contour based upon values of the first and the second gradient vector components.

4. A computer readable medium encoded with a computer program for determining a sought object contour in a digital microscope image, which includes a plurality of image elements and reproduces a biological material, when executed on the computer, the program being adapted to cause the computer to perform the following:

assigning edge values to at least a first subset of the image elements in the image;

assigning values of a first gradient vector component whose values each comprise a first linear combination of edge values of some surrounding image elements to at least a second subset of the image elements in the image, wherein the first linear combination corresponds to, in arbitrary order, a differentiation in one direction in the image plane and a filtering in the image plane with the inverse of a 3 by 3 filter, the filter corresponding to a filtering with a weighted combination of a Laplace filter and a unity filter;

assigning values of a second gradient vector component whose values each comprise a second linear combination of edge values of some surrounding image elements to at least a third subset of the image elements in the image, wherein the second linear combination corresponds to, in arbitrary order, a differentiation in another direction in the image plane and a filtering in the image plane with the inverse of a 3 by 3 filter, the filter corresponding to a filtering with a weighted combination of a Laplace filter and a unity filter; and calculating an estimate of the sought object contour based upon values of the first and the second gradient vector components.

5. An arrangement as claimed in claim 3, wherein the first and the second linear combination are calculated using Fourier Transform.

6. A computer readable medium as claimed in claim 4, wherein the first and the second linear combination are calculated using Fourier Transform.

* * * * *